Sept. 22, 1970 P. S. BRANDON ET AL 3,530,408

DISPERSIVE NETWORKS

Filed June 12, 1967 3 Sheets-Sheet 1

INVENTORS
Percy Samuel Brandon
and
Allan Harry Boyce

BY Baldwin Wight Diller & Brown, ATTORNEYS

INVENTORS
Percy Samuel Brandon
and
Allan Harry Boyce
BY Baldwin Wight Diller & Brown, ATTORNEYS INVENTORS
Percy Samuel Brandon
and
Allan Harry Boyce
BY Baldwin Wight Diller & Brown, ATTORNEYS United States Patent Office 3,530,408
Patented Sept. 22, 1970

3,530,408
DISPERSIVE NETWORKS
Percy Samuel Brandon and Allan Harry Boyce, Essex, England, assignors to The Marconi Company Limited, London, England, a British company
Filed June 12, 1967, Ser. No. 645,146
Claims priority, application Great Britain, June 15, 1966, 26,593/66
Int. Cl. H03h 5/100
U.S. Cl. 333—28 4 Claims

ABSTRACT OF THE DISCLOSURE

A dispersive network which is intended for operation over a frequency band with predetermined limits and in which all the sections would ordinarily be all-pass, is modified by replacing at least one all-pass section by a filter section which has a high pass cut-off flank of which the flank band is substantially the same as the frequency band between the lower of said predetermined limits and the lower limit delay frequency of the unmodified network, said filter section also having a filter cut-off delay characteristic which is at least approximately the same as the component group delay characteristic of the normally provided all-pass section which said filter section replaces.

This invention relates to dispersive networks made up of sections with so-called lumped constants.

Dispersive networks are widely used for example in pulse compression radar systems, in spectrum analysers, and in certain communication systems. In general such networks are required to comply with a predetermined law relating group delay to frequency over a predetermined band of frequencies: for example a network may be required to provide a group delay which varies linearly by 9 $\mu$-sec. over a frequency band of 10–19 mc./s. The dispersive networks at present in common use consist entirely of all-pass sections. Such networks do not comply with the closeness which is desirable with requirements such as that just mentioned and the present invention seeks to provide improved dispersive networks which will satisfy such requirements more closely than a known network made up entirely of all-pass sections.

Figure 5:
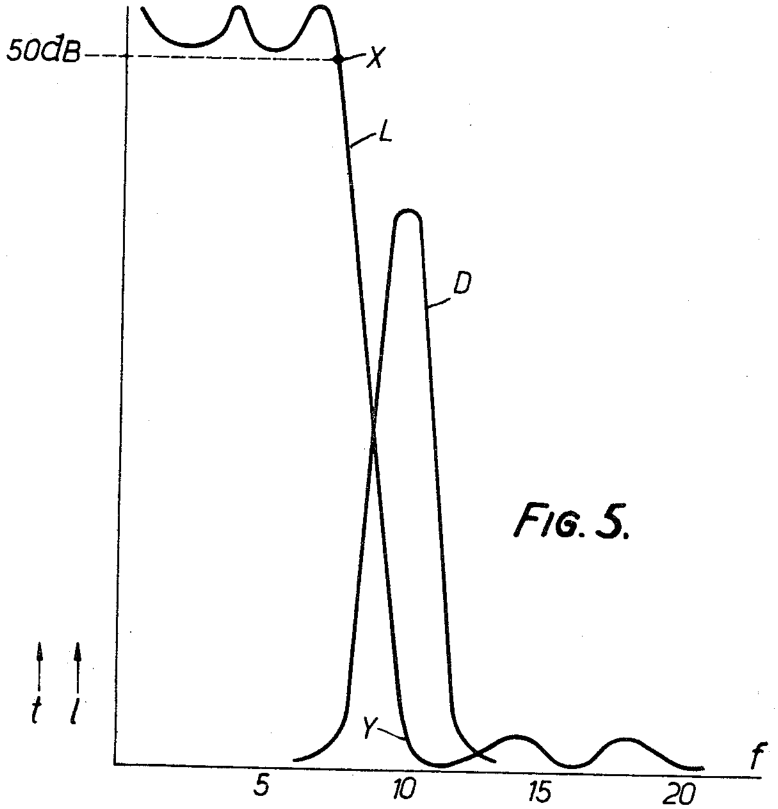
Figure 6:
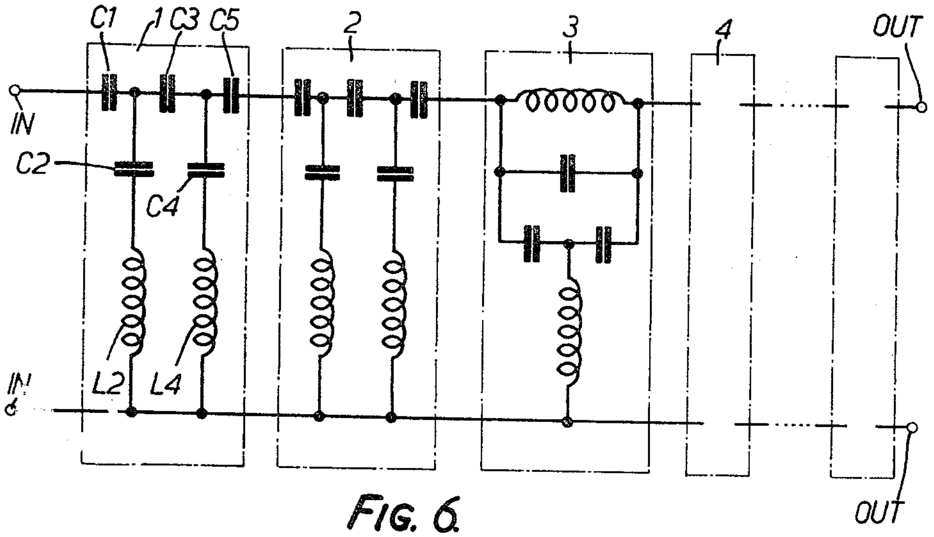

The invention is illustrated in and explained in connection with the accompanying drawings in which FIGS. 1 to 5 are explanatory graphical figures and FIG. 6 is a diagram of one embodiment of the invention.

Figure 1:
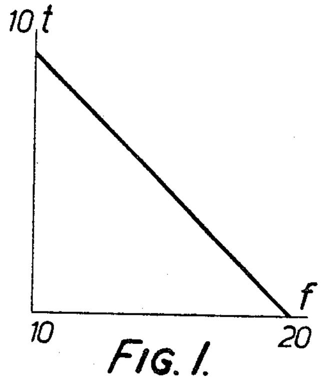
Figure 2:
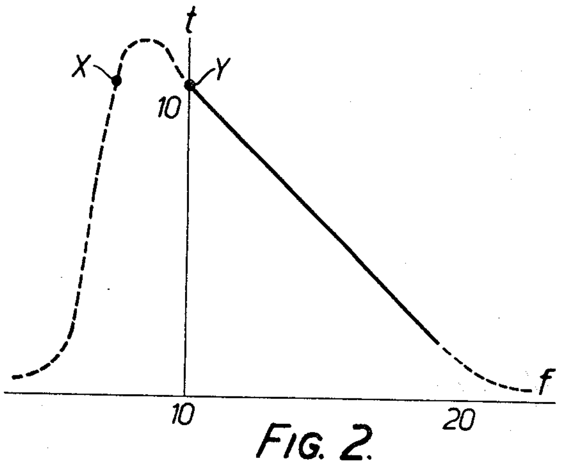

FIG. 1 shows graphically the typical requirement already mentioned for a dispersive line (9 $\mu$-sec, over the band 10–19 mc./s.), the curve connecting group delay ($t$) with frequency ($f$). A known dispersive line composed of all-pass sections will not satisfy this requirement but will produce a result of the nature of that shown in FIG. 2. Here the portion shown in full line corresponds to a linear group delay/frequency relation but the characteristic is undesirably extended, as indicated in broken lines, at both ends. The extension at the lower frequency end is very undesirable and difficult to deal with. In practice it is impossible to design a known dispersive network which will exhibit no group delay outside a desired frequency band (represented in FIG. 1 as the band 10–19 mc./s.) and FIG. 2 shows a typical practical curve from which it will be seen that the linear change is obtained over a group delay range of 11 $\mu$-sec. to 2 $\mu$-sec.

and that there is a marked "pedestal" extension at the lower frequency end. It will be seen that there is a point X at which the same group delay which occurs at the lower limiting frequency (10 mc./s. in the present example) of the desired band, also occurs, but at a lower frequency. This lower frequency (7.5 mc./s. in the present example) will be hereinafter termed, for ease of subsequent reference, the "lower limit image delay frequency." In practice it is commonly necessary to restrict the signal spectrum to the linear portion of the characteristic for if this is not done confusion and interference will be caused by signal frequencies outside the desired band (in FIG. 2, by signal frequencies below the desired band) for, if such frequencies are fed to the network certain individual frequencies outside the band will be subjected to the same group delays as certain individual frequencies inside the band and produce the same results in the output from the network. The lower limit image delay frequency (at X in FIG. 2) is such an individual frequency. The defects of a characteristic as shown by FIG. 2 cannot be overcome by preceding the network by an ordinary band-pass filter with sharp cut-off frequencies (at 10 and 19 mc./s. in the case illustrated by FIG. 2) or a simple high pass filter with a sharp cut-off frequency (at 10 mc./s. for the case of FIG. 2) because such filters have their own group delay/frequency characteristics which would adversely affect the overall group delay/frequency characteristic of the combination of dispersive network and filter and prevent the required overall characteristic being obtained. In fact the sharper the cut-off of the added filter the worse its effect on the overall group delay/frequency characteristic. The addition to a network-filter combination as above described of a group delay equaliser to level the filter group delay/frequency characteristic does not provide a satisfactory solution of the problem because, even if the smallest rate of cut-off is chosen, a considerable number of added all-pass sections would be required in the equaliser. To quote practical figures for the case illustrated by FIGS. 1 and 2, this expedient of adding a group delay equaliser to compensate for the group delay effects of the added filter would involve increasing the number of sections in the dispersive network from 41 to at least 48, thus causing a very substantial increase in cost.

The present invention seeks to overcome the foregoing difficulties and defects.

Figure 3:
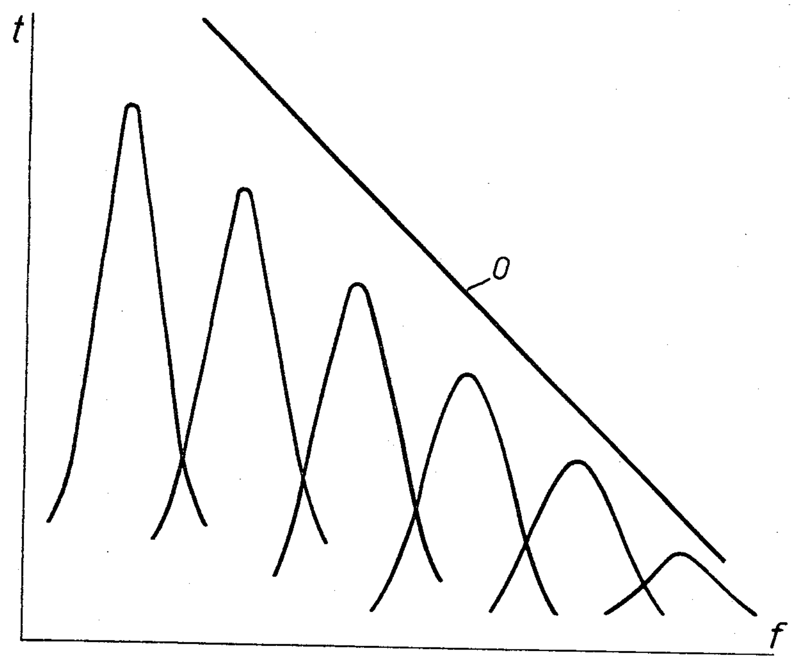
Figure 4:
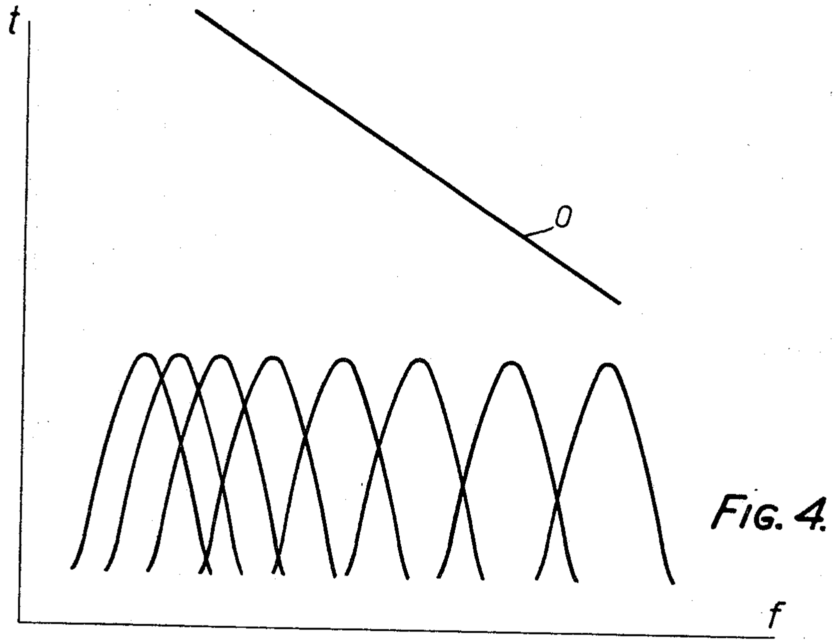

FIGS. 3 and 4 illustrate ways in which the individual component all-pass sections of a dispersive network consisting entirely of such sections contribute to the group delay/frequency characteristic of the whole network. In both figures the line O (shown as a straight line since a linear characteristic is assumed) represents part of the network characteristic. In all cases the network characteristic is the curve of summation of the group delay/frequency characteristics of the individual component all-pass sections comprised in the network. FIGS. 3 and 4 illustrate two extreme cases of design. In both these figures the characteristics of the individual component sections are shown below the line O. In the design represented by FIG. 3 the "peaks" of the individual component characteristics are spaced at equal frequency intervals but their widths, in terms of frequency band spread, are different, increasing, of course, towards the high frequency end. In the design represented by FIG. 4 the widths of the individual characteristics are equal but the frequency spacing of their "peaks" varies, increasing towards the higher frequency end. For the sake of brevity in subsequent description the group delay/frequency characteristics of individual all-pass sections included in a dispersive network will be hereinafter termed "component group delay characteristics."

FIG. 5 shows graphically the natures of the insertion loss/frequency (*l/f*) characteristic L and the group delay/frequency (*t/f*) characteristic D obtained in the neighbourhood of the cut-off frequency of a high pass filter or, for the matter of that, in the neighbourhood of the upper cut-off frequency of a band pass filter. The curves are drawn for a filter in which the insertion loss curve has a practically linear falling portion dropping from about 50 db to about .2 db over the frequency band of 7.5 mc./s. to 10 mc./s. This part of such an insertion loss/frequency curve will hereinafter be termed, for convenience of reference the "cut-off flank" and the band of frequencies over which it extends will be hereinafter termed the "flank band." A group delay/frequency characteristic such as the characteristic D of FIG. 5, obtained in the neighbourhood of the cut-off frequency of a filter will be hereinafter termed, for ease of subsequent reference, the "filter cut-off delay characteristic."

According to this invention a dispersive network which is intended for operation over a frequency band with predetermined limits and in which all the sections would ordinarily be all-pass, is modified by replacing at least one all-pass section by a filter section which has a high pass cut-off flank of which the flank band is substantially the same as the frequency band between the lower of said predetermined limits and the lower limit delay frequency of the unmodified network, said replacing filter section also having a filter cut-off delay characteristic which is at least approximately the same as the component group delay characteristic of the normally provided all-pass section which said filter section replaces.

Preferably two or some other even number of all-pass sections of the unmodified network are replaced by filter sections all having high pass cut-off flanks with substantially the same flank band and each having a filter cut-off delay characteristic approximately the same as the component group delay characteristic of the particular all-pass section which it replaces.

Preferably the replacement of an all-pass section or sections by a filter section or sections is effected at the lower frequency end of the intended operating frequency band of the network.

The replacing filter sections may take any of a variety of different forms but a preferred form consists of a plurality of condensers in a series arm and a plurality of shunt arms, one between each two successive condensers and each comprising a series tuned circuit.

FIG. 6 is a diagram showing, so far as is necessary, one embodiment of the invention. The dispersive network shown in FIG. 6 consists of a large number of sections (for example 41) each of which is represented by one of the chain line blocks 1, 2, 3 . . . . . —*n*. In a known filter all these sections would be all-pass. For example they might be as shown in the block referenced 3 which shows a typical known all-pass section circuit. In accordance with this invention, however, one or more of the sections, as shown the first two at the lower frequency end of the predetermined frequency band of operation of the network, is replaced by a high pass filter section. A suitable circuit for these replacing sections is shown in each of the blocks 1 and 2. Each has a cut off flank with substantially the same flank band. Thus, if group delay/frequency characteristic of a known dispersive network consisting of the same number of sections as in FIG. 6, but all of them all-pass, were as shown in FIG. 2 the flank band of the cut off flanks of the replacing filter sections 1 and 2 would extend substantially between the frequencies of the points X and Y as shown in FIG. 2, and as indicated by the same letters X and Y in FIG. 5. The cut-off delay characteristics of the replacing filter sections 1 and 2 would, however, approximate to the component group delay characteristics of the first and second all-pass sections are replaced.

In order that the invention may be the better understood, a numerical example will now be given for the case already envisaged in which the intended operating frequency band is from 10 mc./s. to 19 mc./s., it being required to reject frequencies below 7.5 mc./s. and accept those above 10 mc./s. Suppose the group delay/frequency characteristic of a known filter consisting entirely of all-pass sections is as shown by FIG. 2 and that the first two all-pass sections are to be replaced, in accordance with this invention, by high pass filter. Then, if the filter section circuits are as shown in blocks 1 and 2 of FIG. 6 the following component values (referring to the references in block 1 of FIG. 6), obtainable by known methods of filter calculation, will be found satisfactory:

$C_1$=383.7 pf.
$C_2$=1407.0 pf.
$C_3$=228.2 pf.
$C_4$=431.3 pf.
$C_5$=603.9 p.f.
$L_2$=0.6980 μh.
$L_4$=1.085 μh.

The above figures are for a dispersive line with a 50 ohm impedance level. It will be observed that the two filter sections 1 and 2 are to the same design but since their cut-off delay characteristics have to "match" component group delay characteristics which are very similar, being those of two adjacent replaced all-wave sections, the single design provides a sufficiently close approximation to theoretical requirements to be used for both replacing sections.

We claim:

1. An improved dispersive network having a linear group delay/frequency characteristic for operation over a frequency band with predetermined limits and wherein a given number of filter sections, all of which ordinarily would be all-pass, would be provided; the improved network comprising a number of all-pass filter sections at least one less than said given number; and additional filter sections comprising at least one additional filter section to provide for a total number of filter sections equal to said given number, said at least one filter section consisting of a plurality of condensers in a series arm and a plurality of shunt arms, one between each two successive condensers and each comprising a series tuned circuit and having a high-pass cut-off flank of which the flank band is substantially the same as the frequency band between the lower of said predetermined limits and the lower limit delay frequency of a network composed entirely of all-pass filter sections, said at least one additional filter section also having a filter cut-off delay characteristic substantially the same as the component group delay characteristic of an all-pass section which said at least one additional filter section effectively replaces.

2. A network as claimed in claim 5 wherein an even number of the ordinarily provided all-pass sections are effectively replaced by filter sections all having high pass cut-off flanks with substantially the same flank band and each having a filter cut-off delay characteristic approximately the same as the component group delay characteristic of the particular all-pass section which it effectively replaces.

3. A network as claimed in claim 1 wherein the effective replacement of an all-pass section by said at least one filter section is effected at the lower-frequency end of said frequency band of the network.

4. A network as claimed in claim 2 wherein the effective replacement of each effectively replaced all-pass filter section is effected at the lower frequency end portion of said frequency band of the network.

(References on following page)

References Cited

UNITED STATES PATENTS

| | | | |
|---|---|---|---|
| 3,122,716 | 2/1964 | Whang | 333—28 |
| 3,196,371 | 7/1965 | Marie | 333—28 |
| 3,365,679 | 1/1968 | Matsumoto | 333—28 |
| 3,316,510 | 4/1967 | Poschenrieder | 333—72 |

HERMAN KARL SAALBACH, Primary Examiner
C. L. BARAFF, Assistant Examiner

U.S. Cl. X.R.

333—29, 70, 75